US012347351B2

(12) United States Patent
Kim et al.

(10) Patent No.: US 12,347,351 B2
(45) Date of Patent: Jul. 1, 2025

(54) DISPLAY DEVICE AND METHOD OF DRIVING THE SAME

(71) Applicant: Samsung Display Co., LTD., Yongin-si (KR)

(72) Inventors: Jongbin Kim, Seongnam-si (KR); Jungki Min, Suwon-si (KR); Boyoung An, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/977,015

(22) Filed: Oct. 31, 2022

(65) Prior Publication Data

US 2023/0298494 A1 Sep. 21, 2023

(30) Foreign Application Priority Data

Mar. 15, 2022 (KR) ........................ 10-2022-0032106

(51) Int. Cl.
*G09G 3/00* (2006.01)
*G09G 3/20* (2006.01)

(52) U.S. Cl.
CPC ............... *G09G 3/006* (2013.01); *G09G 3/20* (2013.01); *G09G 3/2096* (2013.01); *G09G 2300/0842* (2013.01); *G09G 2320/029* (2013.01); *G09G 2330/027* (2013.01); *G09G 2330/04* (2013.01)

(58) Field of Classification Search
CPC ........ G09G 3/006; G09G 3/20; G09G 3/2096; G09G 2300/0842; G09G 2320/029; G09G 2330/027; G09G 2330/04
See application file for complete search history.

(56) References Cited

U.S. PATENT DOCUMENTS

| | | | | |
|---|---|---|---|---|
| 10,019,950 | B2 * | 7/2018 | Tani | G09G 3/3233 |
| 2014/0329339 | A1 * | 11/2014 | Chaji | G09G 3/006 438/10 |
| 2016/0351095 | A1 * | 12/2016 | Tani | G09G 3/3233 |
| 2019/0189038 | A1 * | 6/2019 | Park | G09G 3/3225 |
| 2020/0402432 | A1 * | 12/2020 | Yang | G09G 3/3233 |

FOREIGN PATENT DOCUMENTS

| | | |
|---|---|---|
| KR | 10-2239898 | 4/2021 |

* cited by examiner

*Primary Examiner* — Matthew A Eason
*Assistant Examiner* — Sujit Shah
(74) *Attorney, Agent, or Firm* — KILE PARK REED & HOUTTEMAN PLLC

(57) ABSTRACT

A display device includes a display panel including pixels, a data driver receiving sensing data corresponding to a driving current value of a driving transistor of each of the pixels, and a driving controller calculating a change amount of the sensing data, determining bad pixels based on the change amount of the sensing data, and performing a panel protection operation based on a number of the bad pixels.

12 Claims, 10 Drawing Sheets

DISPLAY DEVICE AND METHOD OF DRIVING THE SAME

CROSS REFERENCE TO RELATED APPLICATION(S)

This application claims priority to and benefits of Korean Patent Application No. 10-2022-0032106 under 35 U.S.C. § 119, filed on Mar. 15, 2022, in the Korean Intellectual Property Office (KIPO), the contents of which are herein incorporated by reference in their entireties.

BACKGROUND

1. Technical Field

Embodiments of the disclosure relate to a display device performing a panel protection operation and a method of driving the display device.

2. Description of the Related Art

Generally, a display device may include a display panel, a driving controller, gate driver, and a data driver. The display panel may include multiple gate lines, multiple data lines, and multiple pixels electrically connected to the gate lines and the data lines. The gate driver may provide gate signals to the gate lines. The data driver may provide data voltages to the data lines. The driving controller may control the gate driver and the data driver. Also, the display device may apply a power voltage for emitting light to the pixels. However, when a panel defect (such as a short circuit in a circuit for applying a power voltage to the pixels) occurs, a high current may flow through the pixels, which may cause burnt and fire.

SUMMARY

Embodiments of the disclosure provide a display device that performs a panel protection operation based on sensing data.

Embodiments of the disclosure also provide a method of driving the display device.

According to embodiments of the disclosure, a display device may include a display panel including pixels, a data driver receiving sensing data corresponding to a driving current value of a driving transistor of each of the pixels, and a driving controller calculating a change amount of the sensing data, determining bad pixels based on the change amount of the sensing data, and performing a panel protection operation based on a number of the bad pixels.

In an embodiment, the driving controller may perform the panel protection operation in case that the number of the bad pixels is greater than or equal to a first reference value.

In an embodiment, the panel protection operation may be an operation of powering off the display device.

In an embodiment, the driving controller may determine the pixels in which the change amount of the sensing data is greater than or equal to a second reference value as bad candidate pixels, and may determine the bad pixels based on the sensing data of the bad candidate pixels.

In an embodiment, the driving controller may determine the bad candidate pixels having the sensing data greater than or equal to a third reference value as the bad pixels, the driving controller may determine the bad candidate pixels having the sensing data less than or equal to a fourth reference value as the bad pixels, and the fourth reference value may be less than the third reference value.

In an embodiment, the driving controller may determine first pixel columns based on the sensing data of the pixels, and the driving controller may determine the bad candidate pixels from among the pixels excluding the pixels included in the first pixel columns.

In an embodiment, the driving controller may perform a plurality of mobility sensing operations after the display device is powered on, may receive the sensing data through the plurality of mobility sensing operations, and may determine the first pixel columns based on the sensing data received through a first-performed one of the plurality of mobility sensing operations performed after the display device is powered on.

In an embodiment, the first pixel columns may include second pixel columns and third pixel columns, the driving controller may determine the second pixel columns in a first mode, the driving controller may determine the third pixel columns in a second mode, the driving controller may operate in the first mode in case that the first mode has been not performed, and the driving controller may operate in the second mode in case that the first mode has been performed.

In an embodiment, the display device may further include a nonvolatile memory device storing information of the second pixel columns and providing information of whether the first mode is performed to the driving controller.

In an embodiment, the driving controller may calculate an average value of the sensing data of the pixels included in an N-th pixel row, the driving controller may determine the pixels included in the N-th pixel row in which a difference between the sensing data of the pixels and the average value is greater than or equal to a fifth reference value as excluded candidate pixels, and the driving controller may determine a M-th pixel column, as one of the first pixel columns in case that a number of the excluded candidate pixels included in the M-th pixel column is greater than or equal to a sixth reference value. Each of N and M may be a positive integer.

According to embodiments of the disclosure, a method of driving a display device may include receiving sensing data corresponding to a driving current value of a driving transistor of each of pixels, determining bad pixels based on a change amount of the sensing data, and performing a panel protection operation based on a number of the bad pixels.

In an embodiment, the panel protection operation may be performed in case that the number of the bad pixels is greater than or equal to a first reference value.

In an embodiment, the panel protection operation may be an operation of powering off the display device.

In an embodiment, the determining of the bad pixels may include comparing the change amount of the sensing data with a second reference value to determine bad candidate pixels, and determining the bad pixels based on the sensing data of the bad candidate pixels.

In an embodiment, the bad candidate pixels having the sensing data greater than or equal to a third reference value may be determined as the bad pixels, the bad candidate pixels having the sensing data less than or equal to a fourth reference value may be determined as the bad pixels, and the fourth reference value may be less than the third reference value.

In an embodiment, the method may further include determining first pixel columns based on the sensing data of the pixels. The bad candidate pixels may be determined from among the pixels excluding the pixels included in the first pixel columns.

In an embodiment, the sensing data may be received through a plurality of mobility sensing operations, and the first pixel columns may be determined based on the sensing data received through a first-performed one of the plurality of mobility sensing operations performed after the display device is powered on.

In an embodiment, the first pixel columns may include second pixel columns and third pixel columns, the second pixel columns may be determined in a first mode, the third pixel columns may be determined in a second mode, the first mode may be operated in case that the first mode has been not performed, and the second mode may be operated in case that the first mode has been performed.

In an embodiment, the determining of the first pixel columns may include calculating an average value of the sensing data of the pixels included in an N-th pixel row, and determining the pixels included in the N-th pixel row in which a difference between the sensing data of the pixels and the average value is greater than or equal to a fifth reference value as excluded candidate pixels. N may be a positive integer.

In an embodiment, the determining of the first pixel columns may further include determining a M-th pixel column as one of the first pixel columns in case that a number of the excluded candidate pixels included in the M-th pixel column is greater than or equal to a sixth reference value. M may be a positive integer.

and determining a M-th pixel column, where M is an arbitrary positive integer, as one of the first pixel columns when a number of the excluded candidate pixels included in the M-th pixel column is greater than or equal to a sixth reference value.

Therefore, the display device may sense a mobility value of a driving transistor by receiving sensing data corresponding to a driving current value of the driving transistor of the pixels.

The display device may perform a panel protection operation to detect a panel defect in real time by performing the panel protection based on sensing data.

Further, the method of driving a display device may prevent erroneous detection of a panel defect by detecting a panel defect based on pixels excluding pixels included in pixel columns in which a simple defect occurs.

However, the effects of the disclosure are not limited to the above-described effects, and may be variously expanded without departing from the spirit and scope of the disclosure.

DETAILED DESCRIPTION OF THE EMBODIMENTS

Figure 1:
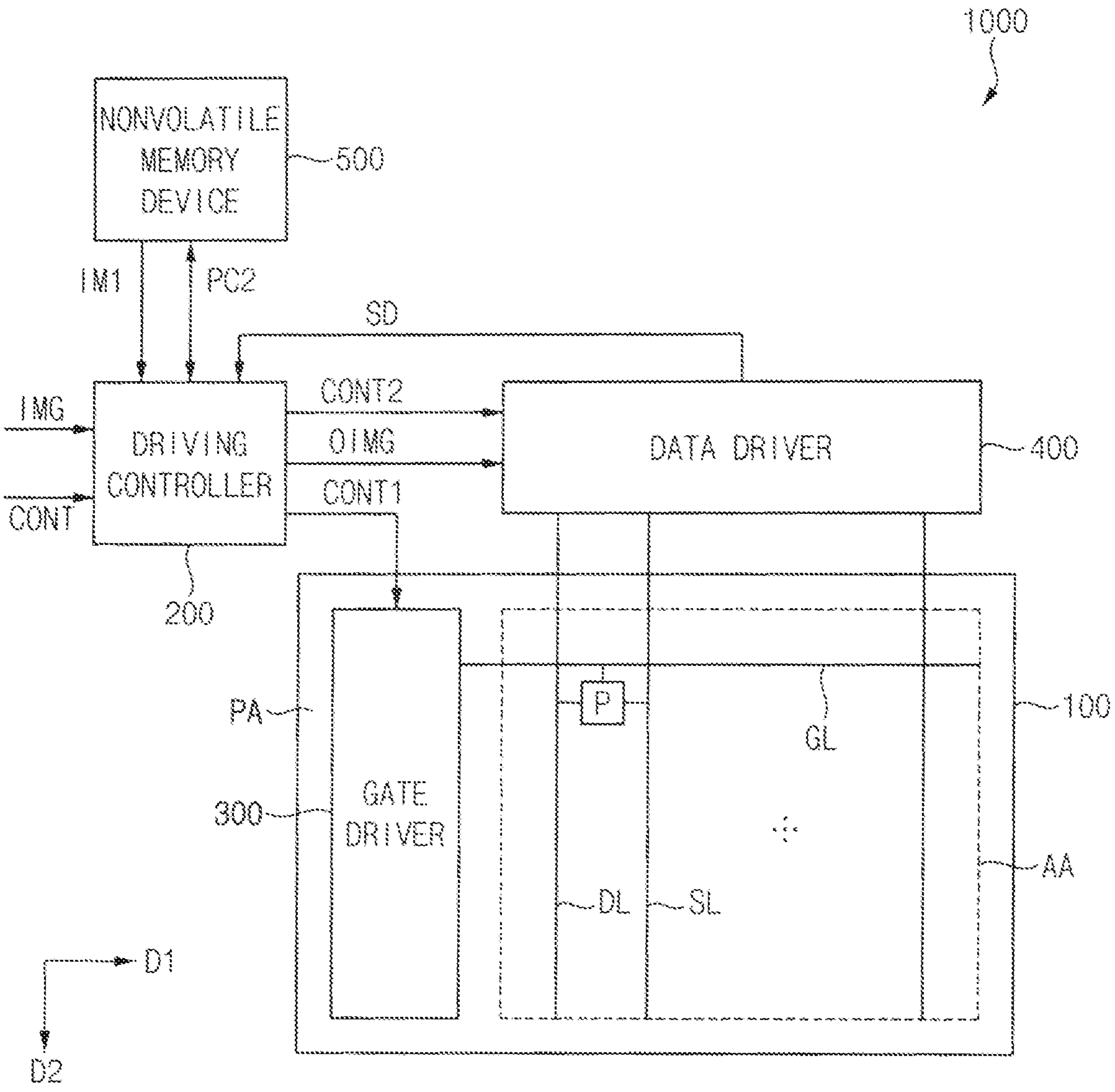
FIG. 1 is a schematic diagram illustrating a display device according to embodiments of the disclosure.

Hereinafter, the disclosure will be explained in detail with reference to the accompanying drawings.

When an element, such as a layer, is referred to as being "on", "connected to", or "coupled to" another element or layer, it may be directly on, connected to, or coupled to the other element or layer or intervening elements or layers may be present. When, however, an element or layer is referred to as being "directly on", "directly connected to", or "directly coupled to" another element or layer, there are no intervening elements or layers present. To this end, the term "connected" may refer to physical, electrical, and/or fluid connection, with or without intervening elements.

Although the terms "first", "second", etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a", "an", and "the" are intended to include the plural forms as well, unless the context clearly indicates otherwise. Moreover, the terms "comprises", "comprising", "includes", and/or "including" when used in this specification, specify the presence of stated features, integers, steps, operations, elements, components, and/or groups thereof, but do not preclude the presence or addition of one or more other features, integers, steps, operations, elements, components, and/or groups thereof.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the disclosure.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic diagram illustrating a display device 1000 according to embodiments of the disclosure.

Referring to FIG. 1, the display device 1000 may include a display panel 100, a driving controller 200, a gate driver 300, and a data driver 400. In an embodiment, the display device 1000 may further include a nonvolatile memory device 500. The driving controller 200 and the data driver 400 may be integrated into one chip.

The display panel 100 may have a display region AA on which an image is displayed and a peripheral region PA adjacent to the display region AA. In an embodiment, the gate driver 300 may be mounted on the peripheral region PA of the display panel 100.

The display panel 100 may include multiple gate lines GL, multiple data lines DL, multiple sensing lines SL, and multiple pixels P electrically connected to the data lines DL, the gate lines GL, and the sensing lines SL. The gate lines GL may extend in a first direction D1 and the data lines DL and the sensing lines SL may extend in a second direction D2 intersecting the first direction D1.

The driving controller 200 may receive input image data IMG and an input control signal CONT from a host processor (e.g., a graphic processing unit; GPU). For example, the input image data IMG may include red image data, green image data, and blue image data. In an embodiment, the input image data IMG may further include white image data. In another embodiment, the input image data IMG may include magenta image data, yellow image data, and cyan image data. The input control signal CONT may include a master clock signal and a data enable signal. The input control signal CONT may further include a vertical synchronizing signal and a horizontal synchronizing signal. The driving controller 200 may receive sensing data SD from the data driver 400. In an embodiment, the driving controller 200 may receive information on second pixel columns PC2 and information IM1 on whether the first mode is performed from the nonvolatile memory device 500. A detailed description of the sensing data SD, the information on the second pixel columns PC2, and the information IM1 on whether the first mode is performed will be described later.

The driving controller 200 may generate a first control signal CONT1, a second control signal CONT2, the information on the second pixel columns PC2, and output image data OIMG based on the input image data IMG, the sensing data SD, the information on the second pixel columns PC2, the information IM1 on whether the first mode is performed, and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL. The data driver 400 may receive the sensing data SD corresponding to a driving current value of a driving transistor of the pixels P. A detailed description thereof will be given later. In an embodiment, the data driver 400 may convert the received sensing data SD into analog-to-digital conversion and apply the converted sensing data SD to the driving controller 200.

In an embodiment, the nonvolatile memory device 500 may store the information on the second pixel columns PC2 and provide the information on whether the first mode is performed to the driving controller 200.

Figure 2:
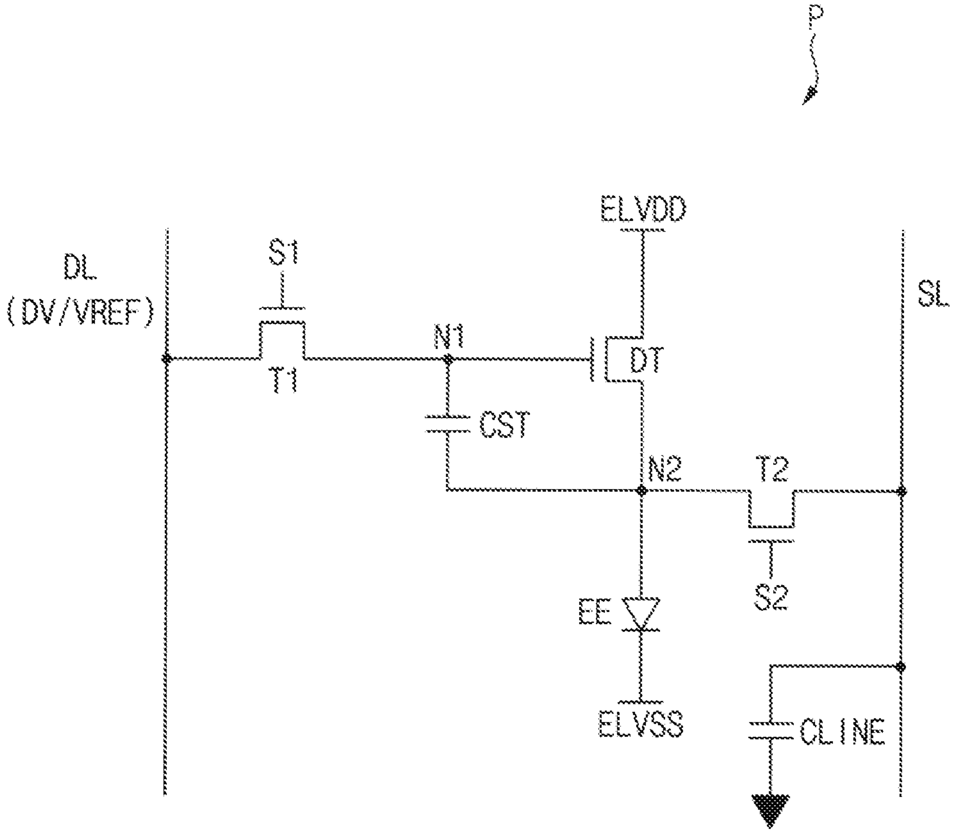
FIG. 2 is a schematic diagram of an equivalent circuit of a pixel of the display device of FIG. 1.

FIG. 2 is a schematic diagram of an equivalent circuit of a pixel of the display device of FIG. 1.

Referring to FIGS. 1 and 2, each of the pixels P may include a first switching transistor T1 applying the data voltage DV (or a reference voltage VREF) to a control electrode (i.e., a first node N1) of a driving transistor DT in response to a first gate signal S1, a storage capacitor CST storing the data voltage DV (or the reference voltage VREF), a driving transistor DT generating the driving current in response to the data voltage DV (or the reference voltage VREF), a light emitting element EE emitting light based on the driving current, and a second switching transistor T2 flowing the driving current to the sensing line SL in response to a second gate signal S2. A sensing capacitor CLINE may be electrically connected to the sensing lines SL.

For example, the first switching transistor ST1 may include a control electrode receiving the first gate signal S1, an input electrode electrically connected to the data line DL, and an output electrode electrically connected to the first node N1, the storage capacitor CST may include a first electrode electrically connected to the first node N1 and a second electrode electrically connected to the second node N2, the driving transistor DT may include a control electrode electrically connected to the first node N1, an input electrode receiving the first power voltage ELVDD, and an output electrode electrically connected to the second node N2, the second switching transistor ST2 may include a control electrode receiving the second gate signal S2, an input electrode electrically connected to the second node N2, and an output electrode electrically connected to the sensing line SL, and the light emitting element EE may include a first electrode electrically connected to the second node N2 and a second electrode receiving a second power voltage ELVSS.

Each frame may include an active period and a vertical blank period. In an embodiment, the data driver 400 may sequentially apply the data voltage DV to the pixels P through the data lines DL in the active period of each frame, and may sequentially apply the reference voltage VREF for an mobility sensing operation to the pixels P through the data lines DL in the vertical blank period of each frame. The data driver 400 may apply the reference voltage VREF to the pixels P to receive the sensing data SD corresponding to the driving current value of the driving transistor DT of the pixels P.

The mobility sensing operation may be an operation of generating the sensing data SD and sensing a mobility value of the driving transistor DT of the pixels P based on the sensing data SD. For example, the data driver 400 may apply the reference voltage VREF to the pixels P through the data lines DL, and the driving transistor DT may generate the driving current corresponding to the reference voltage VREF, and the data driver 400 may receive the sensing data SD corresponding to the driving current value through the sensing lines SL. Also, the driving controller 200 may receive the sensing data SD through the data driver 400, and calculate the mobility value of the driving transistor DT of each of the pixels P based on the sensing data SD.

The driving controller 200 may compensate the input image data IMG based on the mobility value. In the display device 1000, a difference of a mobility characteristic of the driving transistor DT may occur for each pixel P due to a process deviation or the like. To compensate for this difference, the display device 1000 may compensate the data voltage DV applied to the pixel P (i.e., compensate the input image data IMG). Accordingly, a display quality of the display device 1000 may be improved.

Figure 3:
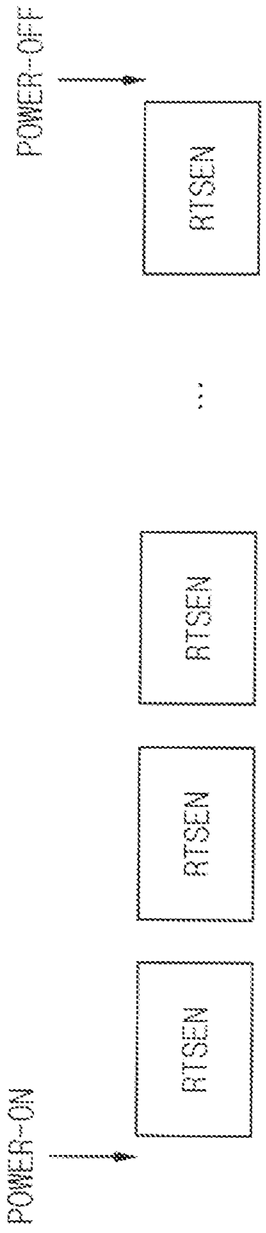
FIG. 3 is a schematic diagram illustrating an embodiment in which the display device of FIG. 1 performs a mobility sensing operation.

FIG. 3 is a schematic diagram illustrating an embodiment in which the display device of FIG. 1 performs the mobility sensing operation RTSEN.

Referring to FIGS. 2 and 3, the driving controller 200 may perform multiple mobility sensing operations RTSEN after the display device 1000 is powered on POWER-ON, and receive the sensing data SD through the mobility sensing operation RTSEN. In case that the display device 1000 is powered on POWER-ON, the display device 1000 may be driven. As described above, the mobility sensing operation RTSEN may include an operation of receiving the sensing data SD corresponding to the driving current value, an operation of calculating the mobility value of the driving transistor DT based on the sensing data SD, and an operation of compensating the input image data IMG based on the mobility value. During one mobility sensing operation RTSEN, the display device 1000 may generate the sensing data SD for all pixel rows. For example, in case that the display device 1000 generates the sensing data SD for one pixel row in each frame, one mobility sensing operation RTSEN may be performed for multiple frames.

Figure 4:
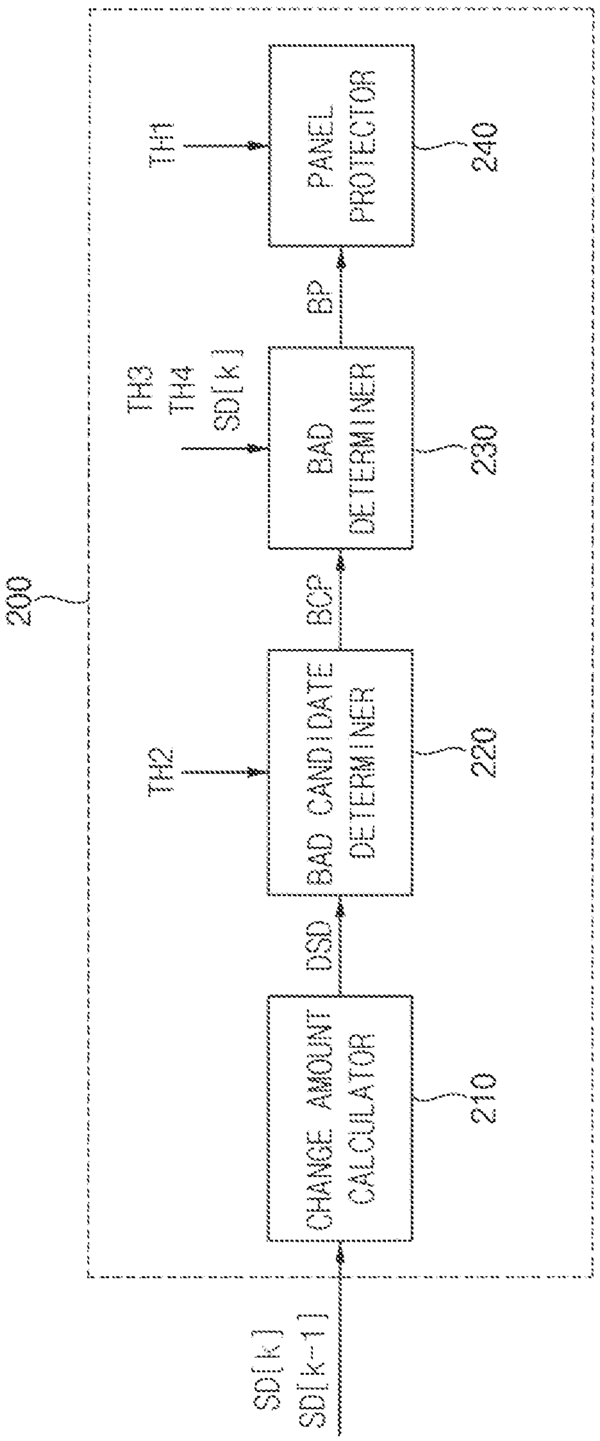
FIG. 4 is a schematic diagram illustrating an embodiment of a driving controller of the display device of FIG. 1.

FIG. 4 is a schematic diagram illustrating an embodiment of the driving controller 200 of the display device 1000 of FIG. 1. Although FIG. 4 illustrates that bad candidate pixels BCP and bad pixels BP are applied, in FIG. 4, information of the bad candidate pixels BCP and the bad pixels BP is applied.

Referring to FIGS. 1 to 4, the driving controller 200 may calculate a change amount DSD of the sensing data, determine the bad pixels BP based on the change amount DSD of the sensing data, and perform a panel protection operation based on the number of the bad pixels. In an embodiment, the driving controller 200 may perform the panel protection operation in case that the number of the bad pixels BP is greater than or equal to a first reference value TH1. The driving controller 200 may determine the pixels in which the change amount DSD of the sensing data is greater than or equal to a second reference value TH2 as the bad candidate pixels BCP, and determine the bad pixels BP based on the sensing data SD of the bad candidate pixels BCP. In an embodiment, the driving controller 200 may determine the bad candidate pixels BCP having the sensing data greater than or equal to a third reference value TH3 as the bad pixels BP, and determine the bad candidate pixels BCP having the sensing data SD less than or equal to a fourth reference value TH4 as the bad pixels BP, and the fourth reference value TH4 may be less than the third reference value TH3.

The driving controller may include a change amount calculator 210, a bad candidate determiner 220, a bad determiner 230, and a panel protector 240. The change amount calculator 210 may receive the sensing data SD and calculate the change amount DSD of the sensing data SD. The bad candidate determiner 220 may determine the bad candidate pixels BCP. The bad determiner 230 may determine the bad pixels BP. The panel protector 240 may perform the panel protection operation.

The change amount calculator 210 may receive the sensing data generated through a previous mobility sensing operation RTSEN (e.g., SD[k−1]) and the sensing data generated through a current mobility sensing operation RTSEN (e.g., SD[k]) to calculate the change amount DSD of the sensing data (where K is an arbitrary positive integer). For example, in case that the display device 1000 generates a k th sensing data SD[k] by performing the k th mobility sensing operation RTSEN, the change amount calculator 210 may calculate a difference between the k−1 th sensing data SD[k−1] generated by performing a k−1 th mobility sensing operation RTSEN and the k th sensing data SD[k] generated by performing a k th mobility sensing operation RTSEN to calculate the change amount DSD of the sensing data. Therefore, the change amount DSD of the sensed data may be a value corresponding to a difference between the driving current value of which the previous mobility sensing operation RTSEN is performed and the driving current value of which the current mobility sensing operation RTSEN is performed.

The bad candidate determiner 220 may determine the pixels P in which the change amount DSD of the sensing data is greater than or equal to the second reference value TH2 as the bad candidate pixels BCP. In case that a panel defect (such as a short circuit in a circuit for applying power voltages ELVDD or ELVSS to the pixels P) occurs, each of the pixels P may generate different driving currents for the same reference voltage VREF. Accordingly, in case that a panel defect occurs, the change amount DSD of the sensing data may be very large. The second reference value TH2 may be set as a change amount DSD of the sensing data by which it is considered that a panel defect occurred. Accordingly, the bad candidate determiner 220 may determine the pixels P in which the change amount DSD of the sensing data is greater than or equal to the second reference value TH2 as the bad candidate pixels BCP, and the bad determiner 230 may determine the bad pixels BP among the bad candidate pixels BCP.

The bad determiner 230 may determine the bad candidate pixels BCP having sensing data greater than or equal to the third reference value TH3 as bad pixels BP, and determine the bad candidate pixels BCP having sensing data SD less than or equal to the fourth reference value TH4 as bad pixels BP, and the fourth reference value TH4 may be less than the third reference value TH3. In case that a panel defect occurs, each of the pixels P may generate a very large or very small driving current for the same reference voltage VREF. Accordingly, in case that a panel defect occurs, the sensing data SD may have a very large value (e.g., the sensing data SD greater than or equal to the third reference value TH3) or a very small value (e.g., the sensing data SD less than or equal to the fourth reference value TH4). For example, since the driving current is very large or small, the sensing data SD corresponding to the driving current value may also be very large or small. The third reference value TH3 and the fourth reference value TH4 may be set to values of the sensing data SD to which it is considered that a panel defect occurred. Accordingly, the bad determiner 230 may determine pixels P having an excessively high or low value of the sensing data SD among the bad candidate pixels BCP as the bad pixels BP.

The panel protector 240 may perform the panel protection operation in case that the number of the bad pixels BP is greater than or equal to the first reference value TH1. In case that the number of the bad pixels BP is greater than or equal to a certain number (i.e., the first reference value TH1), the panel protector 240 may determine that a panel defect occurred. In case that a panel defect occurs, burnt panel or fire may occur, so that the panel protector 240 may perform the panel protection operation. In an embodiment, the panel protection operation may be an operation of powering off the display device 1000. For example, the panel protection operation may be an operation of stopping a driving of the display panel 100. For example, the panel protector 240 may generate a signal indicating that a panel defect occurred, and in case that the signal is generated, voltages for driving the display device 1000 may not be applied to the display device 1000. The panel protector 240 may prevent a burnt panel or fire caused by a high current flowing through the pixels P by stopping the driving of the display panel 100 in case that a panel defect occurred.

Figure 5:
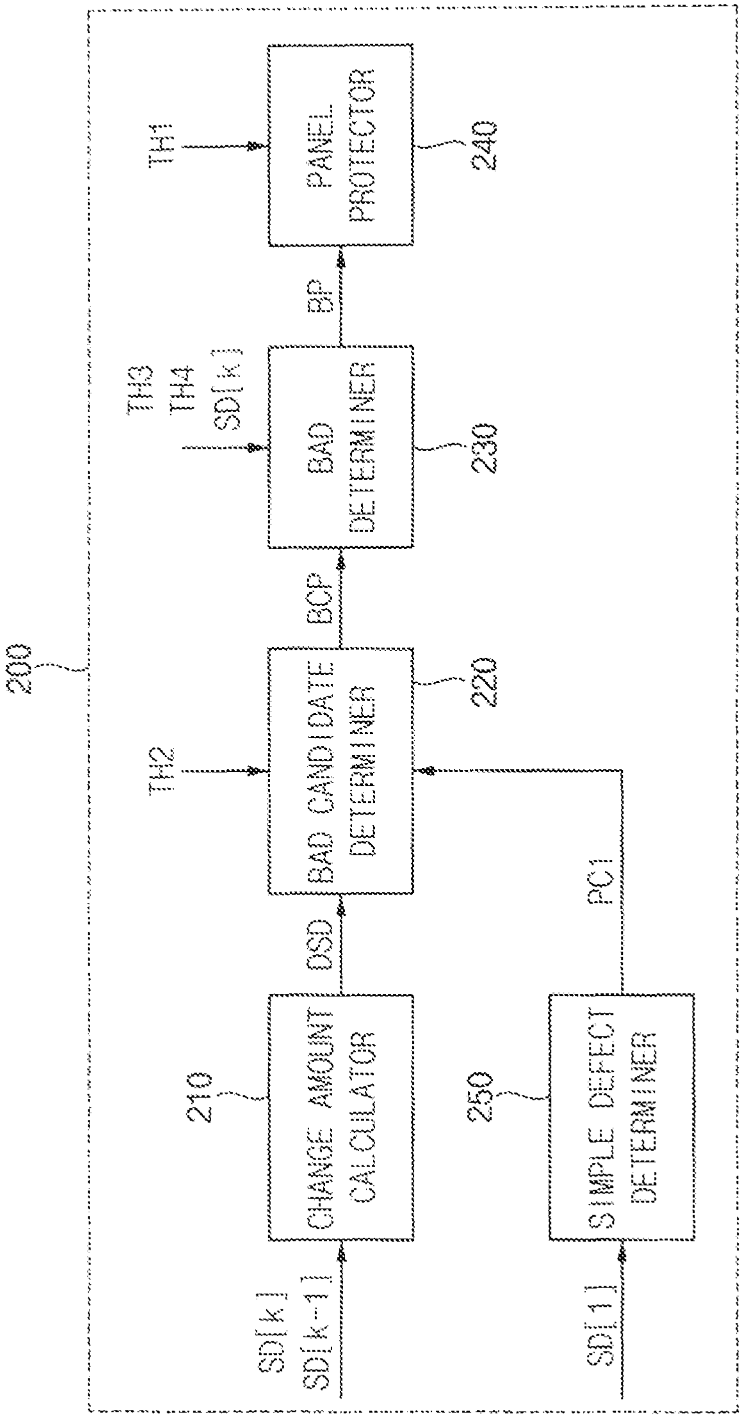
FIG. 5 is a schematic diagram illustrating a driving controller of a display device according to embodiments of the disclosure.
Figure 6:
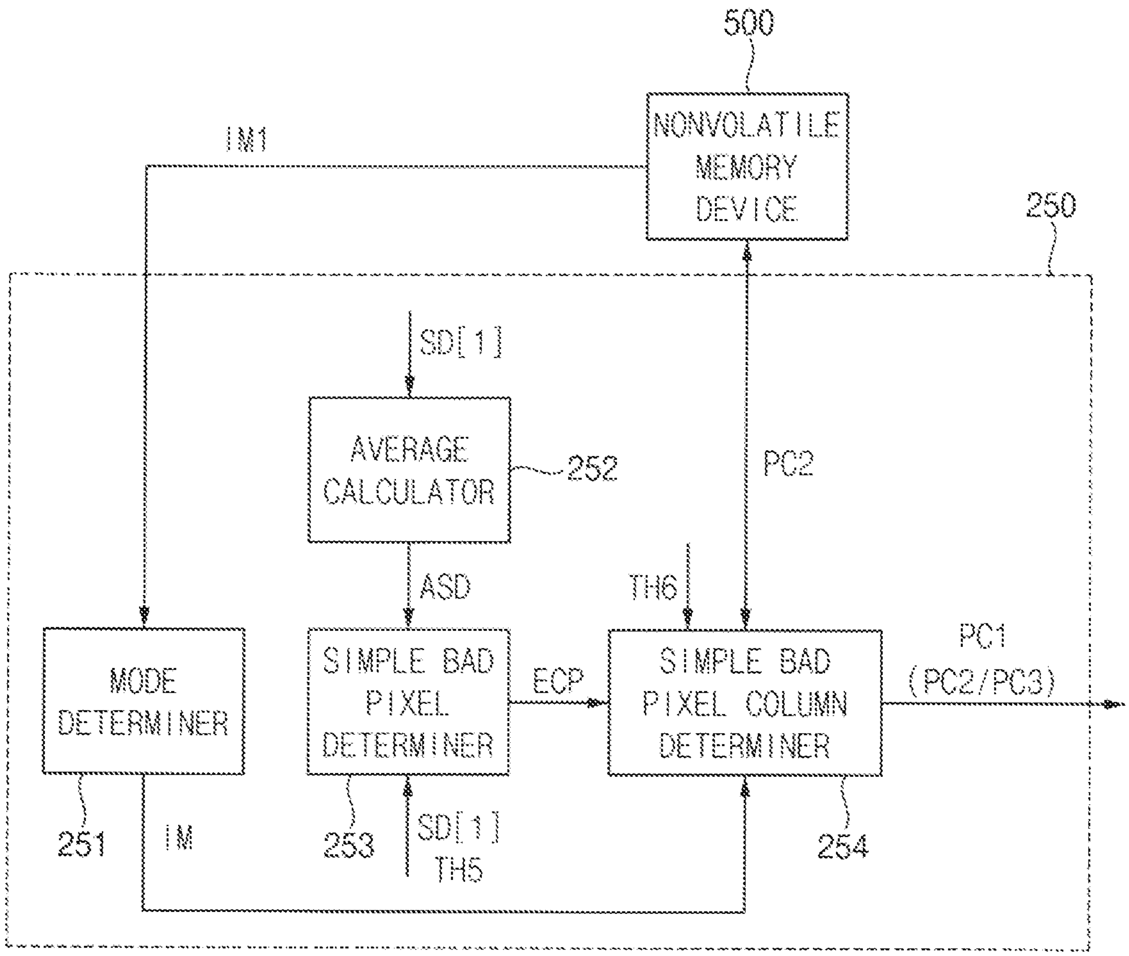
FIG. 6 is a schematic diagram illustrating a simple defeat determiner of the driving controller of FIG. 5.
Figure 7:
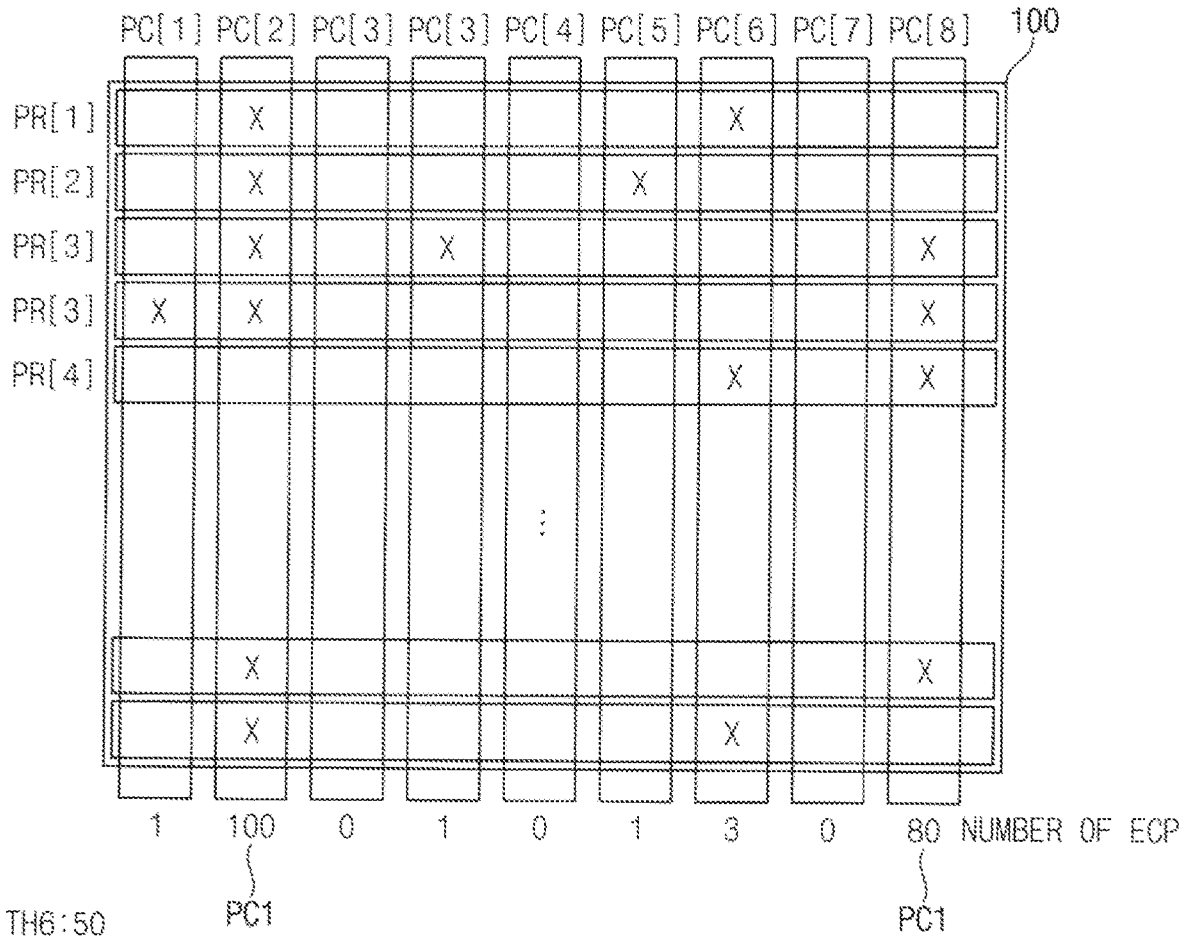
FIG. 7 is a schematic diagram illustrating an embodiment in which the display device of FIG. 5 determines a first pixel column.

FIG. 5 is a schematic diagram illustrating the driving controller 200 of a display device according to embodiments of the disclosure, FIG. 6 is a schematic diagram illustrating a simple defect determiner 250 of the driving controller 200 of FIG. 5, and FIG. 7 is a schematic diagram illustrating an embodiment in which the display device of FIG. 5 determines a first pixel column. Although FIGS. 5 and 6 illustrate that the bad candidate pixels BCP, the bad pixels BP, excluded candidate pixels ECP, a second pixel column PC2, and a third pixel column PC3 are applied, in FIGS. 5 and 6, information of the bad candidate pixels BCP, the bad pixels BP, excluded candidate pixels ECP, the second pixel column PC2, and the third pixel column PC3 is applied.

The display device according to the embodiment is substantially the same as the display device 1000 of FIG. 1 except for the simple defect determiner 250 and the bad candidate determiner 220. Thus, the same reference numerals are used to refer to the same or similar element, and any repetitive explanation will be omitted.

Referring to FIGS. 1 to 3, 5, and 6, the driving controller 200 may determine first pixel columns PC1 based on the sensing data SD of the pixels P, and determine the bad candidate pixels BCP among the pixels P excluding the pixels P included in the first pixel columns PC1. The driving controller may determine the first pixel columns PC1 based on the sensing data SD[1] received through the first mobility sensing operation RTSEN performed after the display device is powered on POWER-ON. The first pixel columns PC1 may include the second pixel columns PC2 and the third pixel columns PC3, the driving controller 200 may determine the second pixel columns PC2 in a first mode, the driving controller 200 may determine the third pixel columns PC3 in a second mode, and the driving controller 200 may operate the first mode in case that the first mode has been not performed, and operate the second mode in case that the first mode has been performed.

The driving controller 200 may include the change amount calculator 210, the bad candidate determiner 220, the bad determiner 230, the panel protector 240, and the simple defect determiner 250. The change amount calculator 210 may receive the sensing data SD and calculate the change amount DSD of the sensing data. The bad candidate determiner 220 may determine the bad candidate pixels BCP. The bad determiner 230 may determine the bad pixels BP. The panel protector 240 may perform the panel protection operation. The simple defect determiner 250 may determine pixel columns in which a simple defect occurred that does not significantly affect product performance generated during a manufacturing stage of the display device (e.g., a defect occurred in the second pixel column PC2) or a simple defect occurred that does not significantly affect product performance generated as the display device is driven (e.g., a defect occurred in the third pixel column PC3) as the first pixel column PC1.

The bad candidate determiner 220 may determine the bad candidate pixels BCP among the pixels P excluding the pixels P included in the first pixel columns PC1. The bad candidate determiner 220 may determine the pixels P in which the change amount DSD of the sensing data is greater than or equal to the second reference value TH2 as the bad candidate pixels BCP excluding the pixels P included in the first pixel columns PC1. In case that a panel defect occurs, each of the pixels P may generate different driving currents for the same reference voltage VREF. Accordingly, in case that a panel defect occurs, the change amount DSD of the sensing data may be very large. The second reference value TH2 may be set as a change amount DSD of the sensing data to which it is considered that a panel defect occurred. Accordingly, the bad candidate determiner 220 may determine the pixels P in which the change amount DSD of the sensing data is greater than or equal to the second reference value TH2 as bad candidate pixels BCP, and the bad determiner 230 may determine the bad pixels BP among the bad candidate pixels BCP. However, the display device may detect a simple defect that does not significantly affect product performance generated in the manufacturing stage of the display device or a simple defect that does not significantly affect product performance generated as the display device is driven, and the driving controller 200 may exclude the simple defect in determining panel defect. A value of the sensing data SD may change due to the simple defect, and the driving controller 200 may erroneously detect panel defect due to the changed value of the sensing data SD. Accordingly, by excluding the first pixel column PC1 in determining the panel defect, the driving controller 200 may more accurately determine a panel defect.

The simple defect determiner 250 may include a mode determiner 251, an average calculator 252, a simple bad pixel determiner 253, and a simple bad pixel column determiner 254. The mode determiner 251 may determine an operation mode of the driving controller 200. The average calculator 252 may calculate an average value ASD of the sensing data SD in each of the pixel rows (PR[1], PR[2], . . . ). In an embodiment, as shown in FIG. 5, the average calculator 252 may calculate the average value ASD of the sensing data SD[1] received through the first mobility sensing operation RTSEN performed after the display device is powered on POWER-ON. The simple bad pixel determiner 253 may determine to exclude candidate pixels ECP based on the average value ASD. The simple bad pixel column determiner 254 may determine the first pixel columns PC1 based on the number of the excluded candidate pixels ECP.

The mode determiner 251 may set the operation mode of the driving controller 200 as the first mode in case that the first mode has been not performed, and set the operation mode to the second mode in case that the first mode has been performed. For example, the mode determiner 251 may receive the information IM1 on whether the first mode is performed from the nonvolatile memory device 500 to determine the operation mode of the driving controller 200. For example, the mode determiner 251 may output a signal IM for the operation mode to the simple bad pixel column determiner 254. Since the first mode is a mode for detecting the simple defect occurring in the manufacturing stage of the display device, the operation mode may be set so that the display device operates the first mode only once for the first time.

The average calculator 252 may calculate the average value ASD of the sensing data SD of the pixels P included in an N-th pixel row, where N is an arbitrary positive integer. In an embodiment, as shown in FIG. 5, the average calculator 252 may calculate the average value ASD of the sensing data SD[1] received through the first mobility sensing operation RTSEN performed after the display device is powered on POWER-ON. For example, detecting the first pixel columns PC1 (i.e., determining the first pixel columns PC1) may be only performed in the first mobility sensing operation RTSEN performed after the display device is powered on POWER-ON. Since detecting of the first pixel column PC1 (i.e., determining of the first pixel column PC1) is to exclude the first pixel column PC1 (i.e., excluding the simple defect) in determining panel defect, detecting of the first pixel column PC1 may be only performed once for the first time after the display device is powered on POWER-ON. The simple bad pixel determiner 253 may determine the pixels P included in the N-th pixel row in which a difference between the sensing data SD (SD[1], in case that the average value ASD is calculated based on SD[1]) of the pixels P and the average value ASD is greater than or equal to a fifth reference value TH5 as the excluded candidate pixels ECP. The simple bad pixel determiner may determine a M-th pixel column, where M is an arbitrary positive integer, as one of the first pixel columns PC1 in case that the number of the excluded candidate pixels BCP included in the M-th pixel column is greater than or equal to a sixth reference value TH6.

For example, since the same reference voltage VREF, the first gate signal S1, and the second gate signal S2 are applied to the pixels P included in the N-th pixel row, in case that the value of the sensing data SD of a specific pixel included in the N-th pixel row greatly deviates from the average value ASD of the sensing data SD of the N-th pixel row, the specific pixel may be a pixel with a simple defect. Accordingly, the simple bad pixel determiner 253 may determine the specific pixel as the excluded candidate pixel ECP. The fifth reference value TH5 may be a difference of values by which the specific pixel is considered to have a defect.

The simple bad pixel column determiner 254 may determine the pixel columns (PC[1], PC[2], . . . ) in which the number of the excluded candidate pixels ECP are equal to or greater than a certain number (i.e., the sixth reference value TH6) as the first pixel columns PC1. For example, as shown in FIG. 7, in case that X indicates the excluded candidate pixels ECP and the sixth reference value TH6 is 50, since the number of the excluded candidate pixels ECP of a 2-th pixel column PC[2] and an 8-th pixel column PC[8] is greater than 50, the 2-th pixel column PC[2] and the 8-th pixel column PC[8] may be first pixel column PC1.

In the first mode, the pixel columns (PC[1], PC[2], . . . ) determined as first pixel column PC1 may be the second pixel column PC2, and information of the second pixel column PC2 may be stored in the nonvolatile memory device 500. In the second mode, the pixel columns (PC[1], PC[2], . . . ) determined as first pixel column PC1 may be the third pixel column PC3. The simple bad pixel column determiner 254 may receive the information of the second pixel column PC2 from the nonvolatile memory device 500 in the second mode, and may send the information of the second pixel column PC2 and the third pixel column PC3 to the bad candidate determiner 220. Accordingly, the bad candidate determiner 220 may determine the bad candidate pixels BCP among the pixels P except for all the pixels P included in the second pixel column PC2 and the third pixel column PC3.

Figure 8:
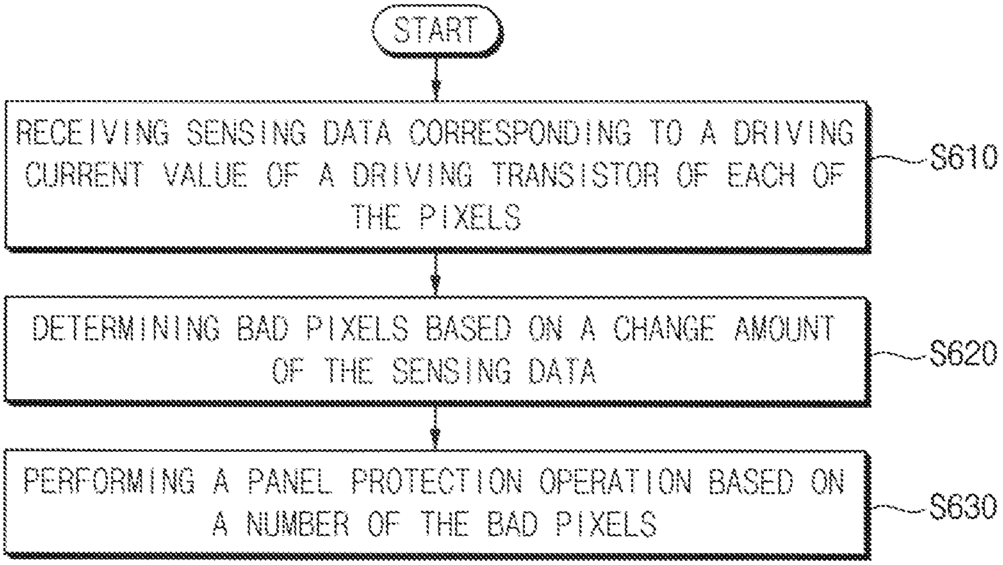
FIGS. 8 to 10 are flowcharts illustrating a method of driving a display device according to embodiments of the disclosure.
Figure 9:
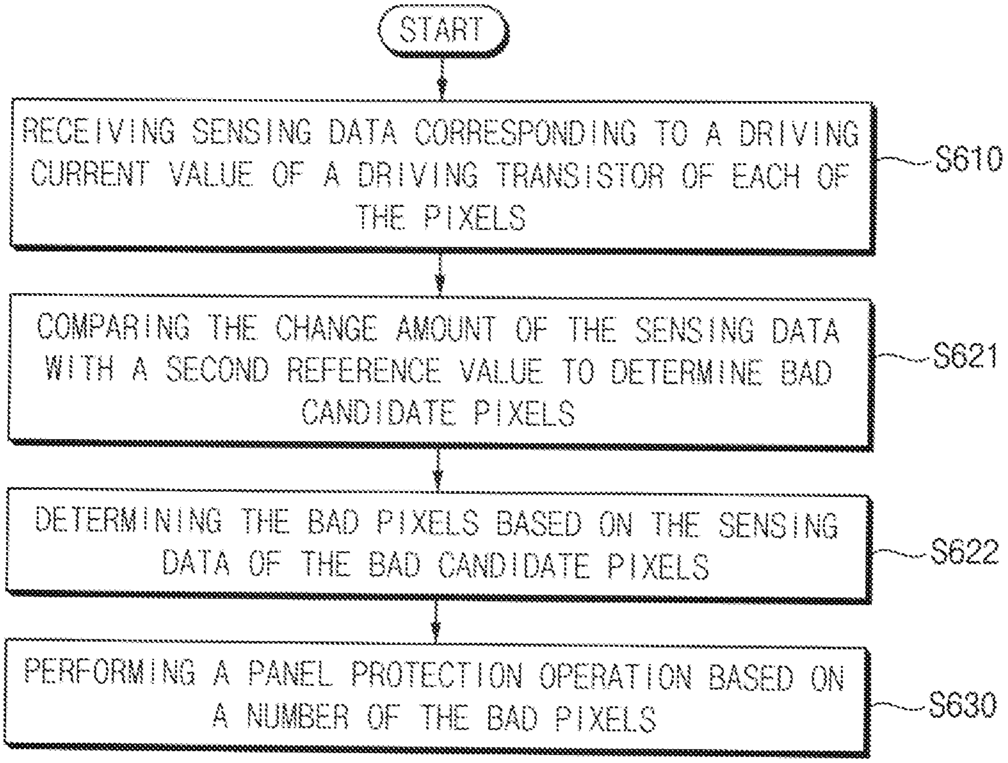
Figure 10:
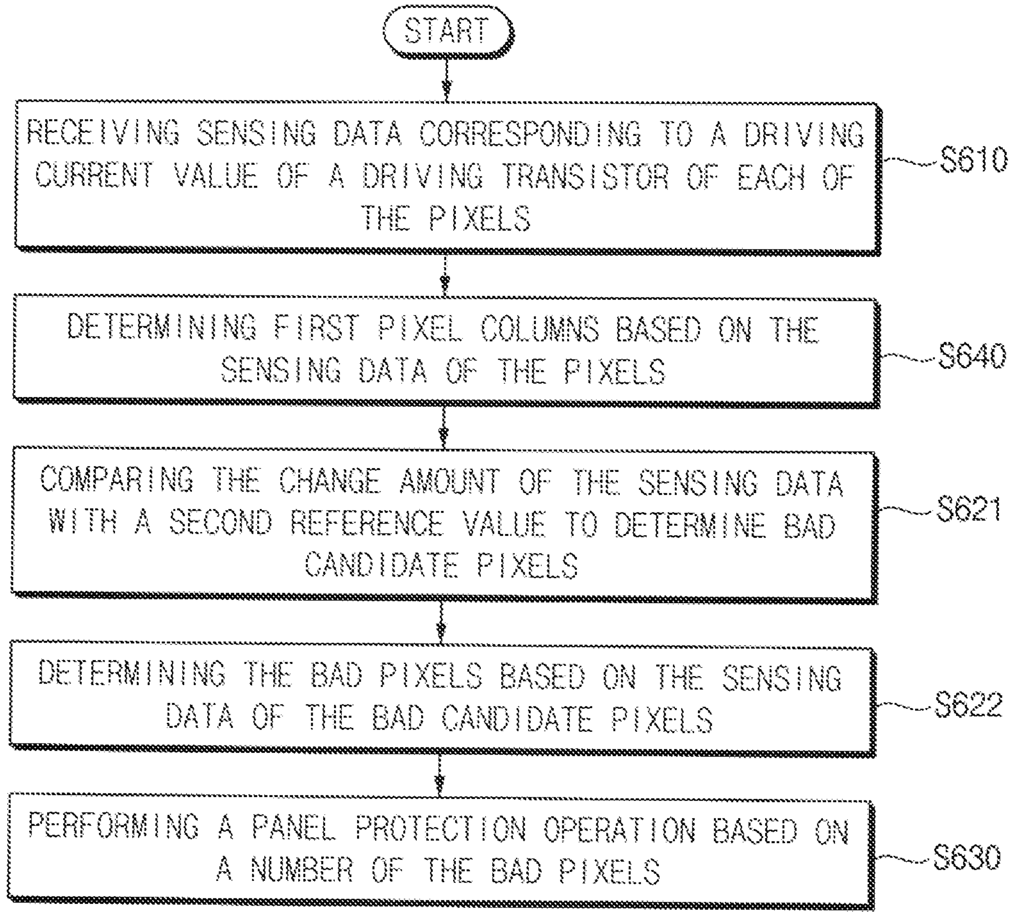

FIGS. 8 to 10 are flowcharts illustrating a method of driving a display device according to embodiments of the disclosure.

Referring to FIGS. 1 to 10, the method may include receiving the sensing data corresponding to the driving current value of the driving transistor DT of each of the pixels P (S610), determining the bad pixels BP based on the change amount DSD of the sensing data (S620), and performing the panel protection operation based on the number of the bad pixels BP (S630). In an embodiment, the method may include determining the first pixel columns PC1 based on the sensing data SD (S640).

For example, the method may include determining the bad pixels BP based on the change amount DSD of the sensing data (S620). The method may include comparing the change amount DSD of the sensing data SD with the second reference value TH2 to determine the bad candidate pixels BCP (S621), and determining the bad pixels BP based on the sensing data SD of the bad candidate pixels BCP (S622). The bad candidate pixels BCP having the sensing data SD greater than or equal to the third reference value TH3 may be determined as the bad pixels BP, the bad candidate pixels BCP having the sensing data SD less than or equal to the fourth reference value TH4 may be determined as the bad pixels, and the fourth reference value TH4 may be less than the third reference value TH3. The second reference value TH2 may be set as a change amount DSD of the sensing data to which it is considered that a panel defect occurred. Accordingly, the bad candidate determiner 220 may determine the pixels P in which the change amount DSD of the sensing data is greater than or equal to the second reference value TH2 as bad candidate pixels BCP, and the bad determiner 230 may determine bad pixels BP among the bad candidate pixels BCP. The third reference value TH3 and the fourth reference value TH4 may be set to values of the sensing data SD to which it is considered that a panel defect occurred. Accordingly, the bad determiner 230 may determine pixels P having an excessively high or low value of the sensing data SD among the bad candidate pixels BCP as the bad pixels BP.

For example, the method may include performing the panel protection operation based on the number of the bad pixels BP (S630). In case that the number of the bad pixels BP is greater than or equal to the first reference value TH1, the method may include determining that a panel defect occurred. In case that a panel defect occurs, burnt panel and fire may occur, so that the panel protector 240 may perform the panel protection operation. In an embodiment, the panel protection operation may be an operation of powering off the display device 1000. For example, the panel protection operation may be an operation of stopping a driving of the display panel 100.

For example, the method may include determining the first pixel columns PC1 based on the sensing data SD (S640). The bad candidate pixels BCP may be determined among the pixels P excluding the pixels P included in the first pixel columns PC1, and may be determined as first pixel columns PC1 based on the sensing data SD[1] received through the first mobility sensing operation RTSEN performed after the display device is powered on POWER-ON. The first pixel columns PC1 may include the second pixel columns PC2 and the third pixel columns PC3, the second pixel columns PC2 may be determined in the first mode, and the third pixel columns PC3 may be determined in the second mode. A value of the sensing data SD may change due to a simple defect, and panel defect may be erroneously detected due to the changed value of the sensing data SD. Accordingly, by excluding the first pixel column PC1 in determining panel defect, a panel defect may be more accurately determined.

For example, the average value ASD of the sensing data SD of the pixels P included in the N-th pixel row may be calculated. In an embodiment, the average value ASD may be calculated based on the sensing data SD[1] received through the first mobility sensing operation RTSEN performed after the display device is powered on POWER-ON. Also, the pixels P included in the N-th pixel row in which a difference between the sensing data SD (SD[1], in case that the average value ASD is calculated based on SD[1]) of the pixels P and the average value ASD is greater than or equal to the fifth reference value TH5 may be determined as excluded candidate pixels ECP. The M-th pixel column may be determined as first pixel column PC1 in case that the number of the excluded candidate pixels BCP included in the M-th pixel column is greater than or equal to the sixth reference value TH6.

The embodiments may be applied to any electronic device including the display device. For example, the embodiments may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising: a display panel including pixels; a data driver receiving sensing data corresponding to a driving current value of a driving transistor of each of the pixels; and a driving controller calculating a change amount of the sensing data, determining whether or not individual pixels are bad pixels based on the change amount of the sensing data for each individual pixel, and performing a panel protection operation based on a number of individual bad pixels that are determined to be bad pixels, wherein the driving controller determines the individual pixels in which the change amount of the sensing data is greater than or equal to a second reference value as individual bad candidate pixels, the driving controller determines the individual bad candidate pixels having the sensing data greater than or equal to a third reference value as the bad pixels, the driving controller determines the individual bad pixels based on the sensing data of the individual bad candidate pixels, the driving controller performs the panel protection operation in case that the number of individual pixels determined to be the bad pixels is greater than or equal to a first reference value, the driving controller determines first pixel columns based on the sensing data of the pixels, and the driving controller determines the bad candidate pixels from among the pixels excluding pixels included in the first pixel columns; wherein the driving controller calculates an average value of the sensing data of the pixels included in an N-th pixel row, the driving controller determines the pixels included in the N-th pixel row in which a difference between the sensing data of the pixels and the average value is greater than or equal to a fifth reference value as excluded candidate pixels, the driving controller determines a M-th pixel column as one of the first pixel columns in case that a number of the excluded candidate pixels included in the M-th pixel column is greater than or equal to a sixth reference value, and each of N and M is a positive integer.

2. The display device of claim 1, wherein the panel protection operation is an operation of powering off the display device.

3. The display device of claim 1, wherein the driving controller determines the individual bad candidate pixels having the sensing data less than or equal to a fourth reference value as the individual bad pixels, and the fourth reference value is less than the third reference value.

4. The display device of claim 1, wherein the driving controller performs a plurality of mobility sensing operations after the display device is powered on, the driving controller receives the sensing data through the plurality of mobility sensing operations, and the driving controller determines the first pixel columns based on the sensing data received through a first-performed one of the plurality of mobility sensing operations performed after the display device is powered on.

5. The display device of claim 4, wherein the first pixel columns include second pixel columns and third pixel columns, the driving controller determines the second pixel columns in a first mode, the driving controller determines the third pixel columns in a second mode, the driving controller operates in the first mode in case that the first mode has been not performed, and the driving controller operates in the second mode in case that the first mode has been performed.

6. The display device of claim 5, further comprising:

a nonvolatile memory device storing information of the second pixel columns and providing information of whether the first mode is performed to the driving controller.

7. A method of driving a display device comprising: receiving sensing data corresponding to a driving current value of a driving transistor of each of pixels; determining individual bad pixels based on a change amount of the sensing data for individual pixels; determining first pixel columns based on the sensing data of the pixels; and performing a panel protection operation based on a number of the individual bad pixels, wherein the determining of the individual bad pixels comprises: comparing the change amount of the sensing data with a second reference value to determine individual bad candidate pixels; and determining the individual bad pixels based on the sensing data of the individual bad candidate pixels; and the panel protection operation is performed in case that the number of the individual bad pixels is greater than or equal to a first reference value, and the bad candidate pixels having the sensing data greater than or equal to a third reference value are determined as the bad pixels, and the individual bad candidate pixels are determined from among the pixels excluding pixels included in the first pixel columns; wherein the determining of the first pixel columns comprises: calculating an average value of the sensing data of the pixels included in an N-th pixel row; and determining the pixels included in the N-th pixel row in which a difference between the sensing data of the pixels and the average value is greater than or equal to a fifth reference value as excluded candidate pixels, and N is a positive integer.

8. The method of claim 7, wherein the panel protection operation is an operation of powering off the display device.

9. The method of claim 7, wherein the individual bad candidate pixels having the sensing data less than or equal to a fourth reference value are determined as the individual bad pixels, and the fourth reference value is less than the third reference value.

10. The method of claim 7, wherein the sensing data is received through a plurality of mobility sensing operations, and the first pixel columns are determined based on the sensing data received through a first-performed one of the plurality of mobility sensing operations performed after the display device is powered on.

11. The method of claim 10, wherein the first pixel columns include second pixel columns and third pixel columns, the second pixel columns are determined in a first mode, the third pixel columns are determined in a second mode, the first mode is operated in case that the first mode has been not performed, and the second mode is operated in case that the first mode has been performed.

12. The method of claim 7, wherein the determining of the first pixel columns further comprises: determining a M-th pixel column as one of the first pixel columns in case that a number of the excluded candidate pixels included in the M-th pixel column is greater than or equal to a sixth reference value, and M is a positive integer.

* * * * *